United States Patent [19]

Anderson

[11] Patent Number: 5,299,860
[45] Date of Patent: Apr. 5, 1994

[54] SNOWMOBILE STUD FASTENER

[76] Inventor: Lynn J. Anderson, 13365 Newlander Ave., Lindstrom, Minn. 55045

[21] Appl. No.: 879,412

[22] Filed: May 7, 1992

[51] Int. Cl.$^5$ ............................................. B62D 55/28
[52] U.S. Cl. .................................. 305/54; 305/35 EB; 411/366
[58] Field of Search .................. 305/35 R, 35 EB, 39, 305/51, 53, 54, 55; 411/366

[56] References Cited

U.S. PATENT DOCUMENTS

| | | | |
|---|---|---|---|
| 2,833,326 | 5/1958 | Knohl | 151/37 |
| 3,390,924 | 7/1968 | Bumbaugh | 305/35 |
| 3,527,851 | 3/1971 | Schuler | 305/35 |
| 3,782,787 | 11/1974 | Rubel | 305/35 |
| 3,785,420 | 1/1974 | Bradley et al. | 151/37 |
| 3,838,894 | 10/1974 | Reedy | 305/35 EB |
| 3,883,190 | 5/1975 | Kilbane, Jr. | 305/35 EB |
| 3,930,689 | 1/1976 | Maki | 305/35 EB |
| 4,023,865 | 5/1977 | Morissette | 305/35 EB |
| 4,059,315 | 7/1977 | Jolliffe et al. | 305/35 EB |
| 4,194,583 | 3/1980 | Aaen | 180/190 |
| 4,294,300 | 10/1981 | Bouwman | 411/185 |
| 4,332,424 | 6/1982 | Thompson | 305/35 EB |
| 4,470,736 | 9/1984 | Tasseron | 411/404 |
| 4,758,055 | 7/1988 | Anderson | 305/35 EB |
| 4,795,221 | 1/1989 | Simmons | 305/35 EB |
| 5,033,801 | 7/1991 | Beely | 305/54 |

Primary Examiner—Russell D. Stormer
Attorney, Agent, or Firm—Jacobson & Johnson

[57] ABSTRACT

A one-piece, lightweight snowmobile fastener for securing a snowmobile stud to a resilient snowmobile track and distributing the cyclical forces on the stud over an extended region on both sides of the track, with the fastener including a collar having a central bore having a female thread for lockingly engaging a male thread on a snowmobile stud with the fastener including a flange having an annular track-engaging face for engaging one surface of a resilient snowmobile track with the flange attached to the collar by a radiused shoulder to permit tear-free engagement of the fastener with a snowmobile track, and an annular reinforcing shoulder integrally connected to the collar to prevent pinching of the track when a force is applied to the end of a snowmobile stud extending through the snowmobile track and the collar in the fastener. The invention also includes a snowmobile power stud that can generate greater traction with a laterally extending blade and still be used with the snowmobile fastener.

36 Claims, 5 Drawing Sheets

SNOWMOBILE STUD FASTENER

FIELD OF THE INVENTION

This invention relates generally to snowmobile equipment and, more specifically, to one-piece fasteners for attaching a snowmobile stud to to a snowmobile track.

BACKGROUND OF THE INVENTION

The concept of studs for snowmobiles is old in the art. Typically, snowmobile studs are located on a flexible and resilient track that engages all sorts of terrain including snow, mud, ice and even, on occasion, asphalt or concrete roads. Since snowmobiles can travel in excess of 100 miles per hour, the snowmobile track and any members secured to the snowmobile must endure high centrifugal forces without destroying the snowmobile track. In addition, the rotation of the snowmobile track subjects the studs and fasteners to substantially cyclical forces which oftentimes cause the head of the snowmobile stud to cut through the snowmobile track. Typically, snowmobile tracks are made from flexible and resilient material which may, in some cases, be only ⅛-inch thick.

Since the centrifugal forces generated by the studs are proportional to their weight, the studs and fasteners should be lightweight. In addition, the studs should be easy to apply or replace if replacement of the studs is required. The studs must also have sufficient tensile strength and wear-resistance to bite into the ice, snow, mud or rocks that they may encounter. To achieve this strength and wear-resistance, the studs are usually made of a hardened steel. Another feature of the studs in that, once installed, they should not work loose but continue to firmly engage the snowmobile track until removed. If the studs do not firmly engage the track, they move about and pinch the track thereby enlarging the hole around the stud and allowing the stud head to be pulled through the track by the centrifugal force generated on the stud.

Typically, the prior art studs are held in place by a nut which rests on a large diameter washer. One of the problems with prior art studs is that, because of the variation in forces applied to the stud, the stud periodically rocks back and forth or tips in relation to the washer or retaining member holding the stud on the track. This tipping pinches the track and creates an area of extremely high pressure on a small portion of the snowmobile track located between the washer and the stud head which tends to, over a period of time, cut a hole through the track. As the hole is cut through the track, it widens and, eventually the stud is thrown out, leaving a large hole and a weakened snowmobile track.

The present invention solves the problems of track deterioration and stud loss in snowmobile tracks by providing a one-piece flanged lightweight fastener which coacts with a snowmobile stud head to capture the track to discourage the track from being pulled from between the head and the fastener. In addition, the fastener maintains the captured portion of the track in a parallel, non-pinching relationship to the head of the snowmobile stud, thus distributing the cyclic tipping forces over both sides of the snowmobile track area captured by the head of the stud and the fastener and virtually eliminating damage of the track due to rocking or tipping action of the snowmobile stud.

BRIEF DESCRIPTION OF THE PRIOR ART

U.S. Pat. No. 3,767,275 shows a traction element for a snowmobile track. The device comprises a metal stiffener which extends across the track. Extending outward from the metal stiffener are a set of metal traction elements which bite into the ice.

U.S. Pat. No. 4,095,849 shows a protruding blade which engages ice and snow. The blade is attached to a link chain of a power-driven ski-type device.

Swedish patent 155,085 shows a bolt-like stud having two washer-like members of equal diameter that sandwich a tire casing from both sides.

U.S. Pat. No. 3,782,787 shows two studs fastened together with a separate washer located under the nut on the stud.

U.S. Pat. No. 3,838,894 shows a snowmobile stud having a nut and separate washer for sandwiching the track therebetween.

U.S. Pat. No. 4,470,736 shows a bushing structure having a threaded central member and a radially extending flange which is used for attachment to barrels and the like.

U.S. Pat. No. 4,059,315 shows a clear anchor which provides a flexible washer which moves up and down in response to forces on the cleat. The purpose of allowing the washer to flex and move is to minimize the problems of the stud rivet-head pulling through the drive track. FIG. 9 shows the separate washer flexing in response to motion of the track.

U.S. Pat. No. 3,930,689 shows a drive belt with cleats which extend partially across the track, with the cleats held in place by rivets.

U.S. Pat. No. 3,572,851 shows another rivet type device for holding a cleat on a track by sandwiching the track between the head of the rivet and the cleat.

U.S. Pat. No. 4,294,300 shows a self-locking fastener, having ratchet-like teeth for forming a locking engagement with a top surface.

U.S. Pat. No. 4,795,221 shows various types of cleats held on a snowmobile track by two-headed rivets.

U.S. Pat. No. 5,033,801 shows a cleat assembly for an endless track in which two members are held in place by a bolt extending through each of the members.

U.S. Pat. No. 3,785,420 shows a solid metallic rivet which has a nut on one end which holds a cleat on one side of a track.

U.S. Pat. No. 4,332,424 shows an endless crawler track having cleats held in position with bolts extending through the track and the cleats.

U.S. Pat. No. 3,390,924 shows a grouser shoe for a vehicle in which cleats are held on by a bolt and a nut extending through a track.

U.S. Pat. No. 2,833,326 shows a screw with locking projections extending from under the head to prevent the nut from working loose during use.

U.S. Pat. No. 3,883,190 shows a traction cleat for a snowmobile in which the cleats extend out from a channel extending through the track. The channel is held in position by a further member to provide quick removal of the channel with the studs.

U.S. Pat. No. 4,023,865 shows a snowmobile track which includes a cleat installed in the track in position to provide a sliding interface between the track and the slide elements and to thereby reduce the friction buildup.

U.S. Pat. No. 4,194,583 shows a traction lug mounted on a snowmobile track and positioned transversely under the track rails so that the forces are directed symmetrically with respect to the track to avoid distortion of the track.

SUMMARY OF THE INVENTION

Briefly, the present invention comprises a one-piece lightweight flanged fastener which extends sufficiently far onto the snowmobile track to compressively sandwich the snowmobile track in a nondestructive relationship between stud and fastener surfaces that remain parallel during operation of the snowmobile to thereby minimize the pinching and cutting forces produced by prior art studs and washers and a stud for use with a slotted fastener.

DESCRIPTION OF THE PREFERRED EMBODIMENT

Figure 1:
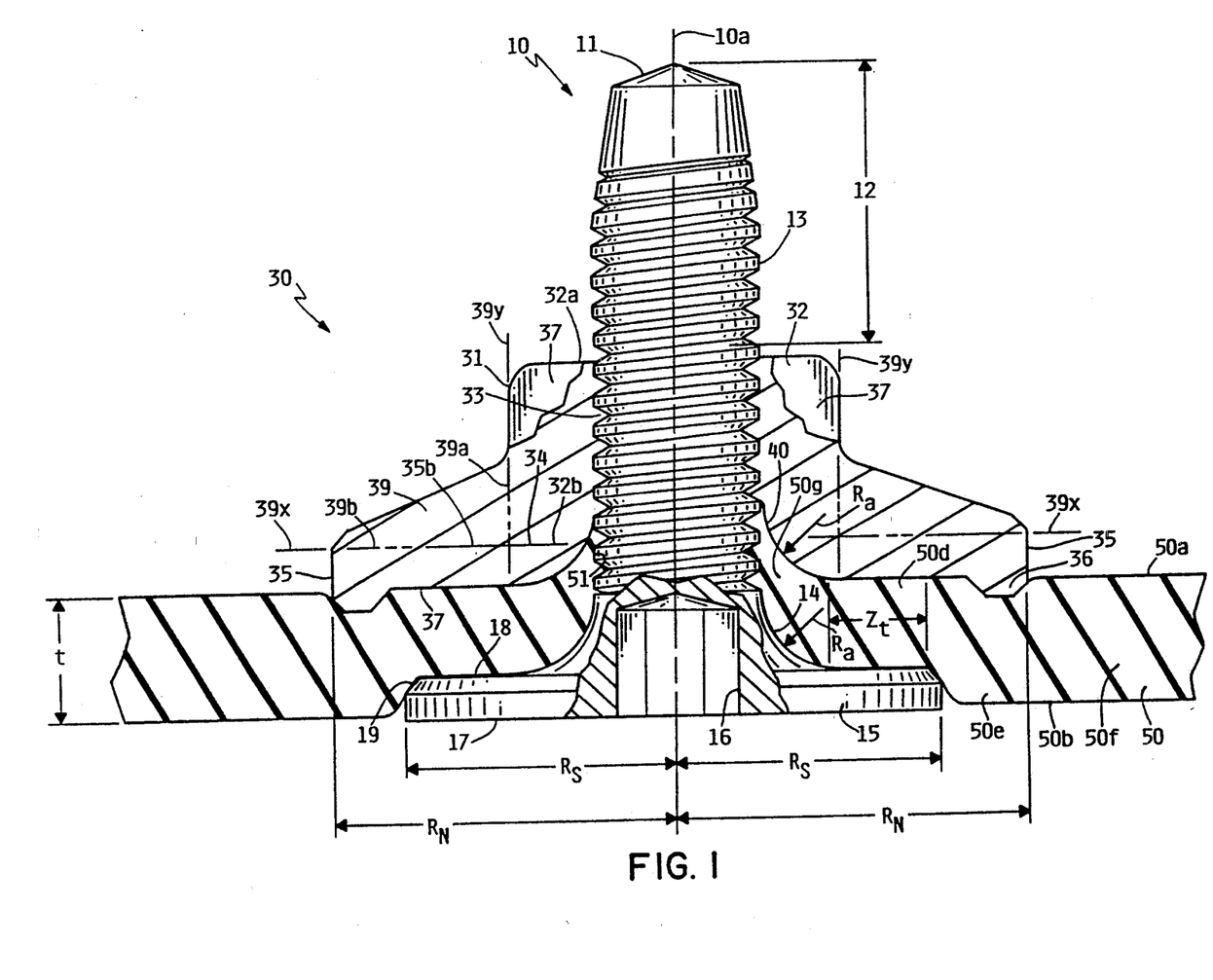
FIG. 1 is a cross-sectional view of my one-piece fastener engaging a stud and a portion of a snowmobile track.

Referring to the drawings, FIG. 1 shows a one-piece, lightweight snowmobile fastener 30 for securing a snowmobile stud 10 to a resilient snowmobile track 50. The fastener 30 includes three regions. The first region is a cylindrical collar 32 having a top end 32a and a bottom end 32b defined by a horizontal plane extending through dashed line 39x. The second region is an annular extending washer flange 35. The top portion of radially extending washer flange 35 is defined by a plane extending through dashed line 39x and is integrally formed to bottom end 32b of cylindrical collar 32. The third region is an annular reinforcing ring 39 whose top is defined by a horizontal plane extending through horizontal dashed line 39x and whose inner surface is defined by a cylinder extending through vertical dashed lines 39y. The annular reinforcing ring 39 is integrally attached to sleeve 32 along region 39a and to flange 35 along region 39b.

It is pointed out that fastener 30 is one-piece; however, to understand the operation and coaction of the regions of the fastener, portions of the fastener members have been identified separately. Fastener 30 also includes a set of female threads 33 for rotating fastener unto stud 10.

Located on the underside of flange 35 is an annular track-engaging face 37 with a track-gripping ring 36 located on the outer periphery of fastener 30. The interior portion of fastener 30 includes a radiused shoulder 40 of radius $R_a$ which smoothly connects threads 33 in collar 32 with annular track-engaging face 37. Radiused annular shoulder 40 provides a smooth transition from the female threads 33 to annular track engaging face 37.

Located in threaded engagement with fastener 30 is a snowmobile stud 10 having a conical, hardened, wear-resistant tip 11 and a stud shaft with a male thread 13 for engaging female thread 33 in fastener 30. Stud 10 includes a head 15 having a flat, outer-circular face 17 with a recessed hex head socket 16 for engagement with a tool, such as a hex wrench.

Located on the inner surface of head 15 is an annular stud-face 18 having a chamfered or beveled outer edge 19. Annular stud-face 18 and edge 19 are free of any surfaces which would cut or tear the track if the stud should rotate in track 50. Stud 10 also includes a radiused shank 14 which has a radius substantially equal to the radius $R_a$ of shoulder 38 on fastener 30. The use of radiused shank 14 on stud 10 provides a dual purpose. First, it provides greater strength at the junction of head 15 to the threaded portion of stud 10. Second, it mates with the annular radiused shoulder 40 on fastener 30 to provide firm, non-pinching, non-destructive gripping of snowmobile track 50 in annular region 50g around hole 51 in track 50. In addition, the surfaces of fastener 30 that engage track 50 are free of any surfaces which would cut or tear the track if the fastener should rotate in track 50.

Located in a compressed relationship between annular track-engaging face 37 of fastener 30 and annular stud-face 18 is snowmobile track 50. Track 50 has a top surface 50a which generally engages the terrain and an inner surface 50b that rides on a pulley drive system.

For the purposes of understanding the operation of the invention four distinct regions or zones are identified in snowmobile track 50. A first annular zone 50g which is located around a hole 51 extending through track 50. Annular zone 50g is shown as sandwiched or wedged between annular radiused flange 14 and annular radiused shoulder 40.

Located adjacent to annular zone 50g is a second annular zone 50d which extends around stud 10. Annular zone 50d is compressed and frictionally held in a parallel relationship between parallel surfaces formed by annular track-engaging face 37 and annular inner stud-face 18.

Extending outward further is a third annular zone 50e where only flange surface 37 and griping ring 36 engage track 50. Extending outward from beyond fastener 30 is the portion of the track 50f which is not in engagement with either stud 10 or fastener 30.

Figures 2, 9, 10, 11:
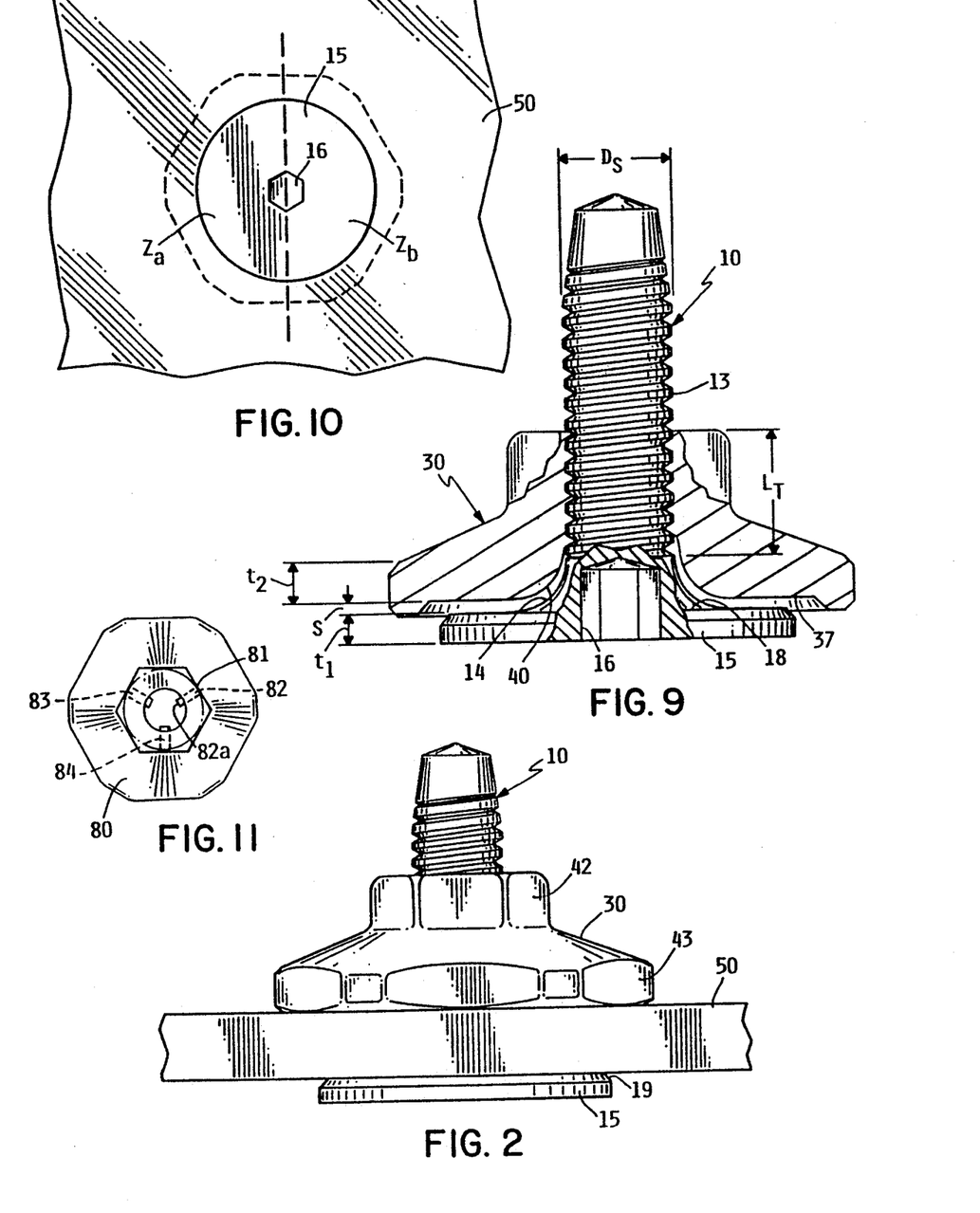
FIG. 2 is a side view of a fastener and stud prior to sandwiching the fastener and stud on a snowmobile track.
FIG. 9 is a cross-sectional view of the stud and fastener without the snowmobile track located therein.
FIG. 10 is a top view of the stud-head located in the snowmobile track defining forward zones and rearward zones.
FIG. 11 is a top view of the lightweight snowmobile fastener with retaining means to prevent the fastener from working free of the stud.

FIG. 1 shows fastener 30 and stud-head 15 compressively engaging track 50 while FIG. 2 shows snowmobile track 50, fastener 30 and stud 10 before compressively engaging track 50. FIG. 9 illustrate the parallel spaced relationship of the various surfaces formed by annular track-engaging face 37 and annular inner stud-face 18 and radiused shoulder 40 and radiused shank 14.

The distance between annular track-engaging face 37 and annular inner stud-face 18 is designated by "s". Note threads 13 on stud 10 extend sufficiently far down on stud 10 so that the distance "s" is less than the amount track 50 can be compressed without compressively destroying the track. Threads 13 do not "bottom out" until after the track is compressed beyond its compressive limits, thereby permitting the user to uniformly apply fastener 30 to stud 10 with a torque wrench. The use of a torque wrench permits one to obtain uniform tightening of fasteners on stud 10 without concern that the fastener "bottoms out" on male threads 13 of stud 10, and thereby does not firmly engage track 50.

Figure 3:
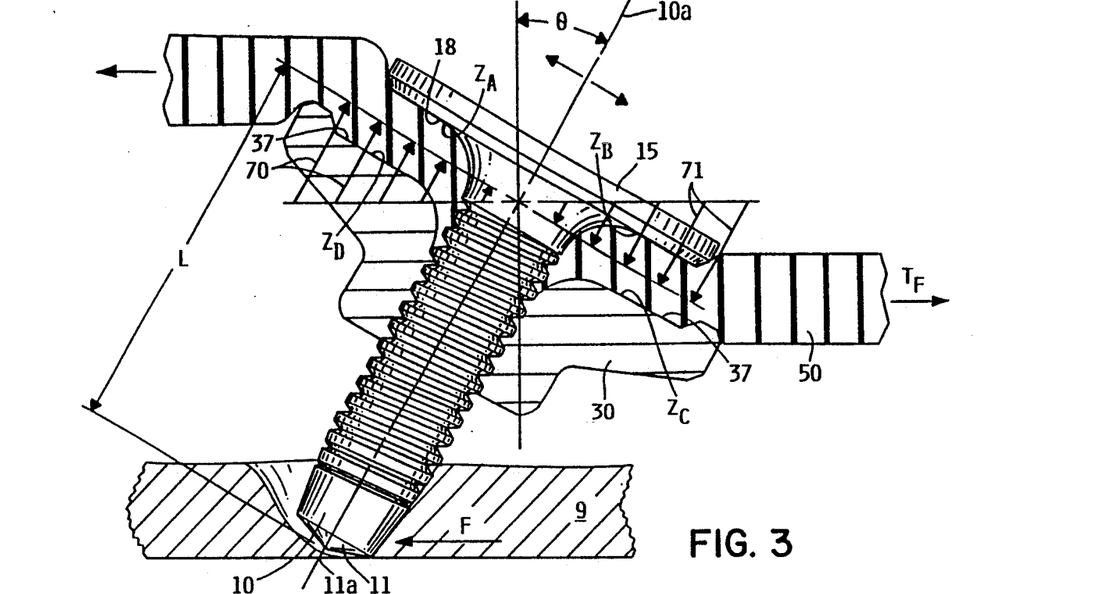
FIG. 3 is a cross-sectional view showing the cyclical forces acting on a snowmobile stud and fastener as the track is propelled along the terrain.
Figure 4:
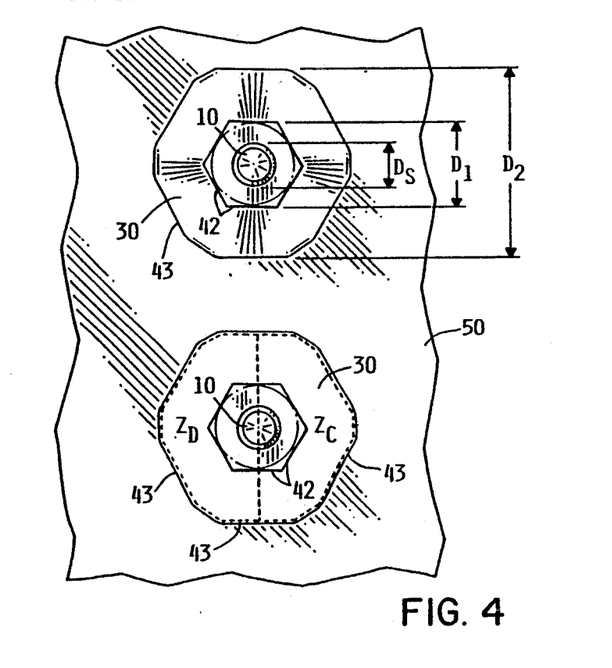
FIG. 4 is a top view of the fasteners located in the snowmobile track defining forward zones and rearward zones.

To illustrate the dynamic forces of stud 10 and fastener 30 which are absorbed by track 50, to FIG. 3. FIG. 3 shows a cross-sectional view of stud 10 gripping ice 9 with an illustration of the forces acting on snowmobile track 50 in different zones of the track. The first zone is a semicircular zone under one portion of head 15 which is designated by $Z_a$ and the second zone is a semicircular zone under another portion of head 15 which is designated by $Z_b$. For identification purposes, FIG. 10 illustrates the two semicircular zones under head 15. The third zone is a semicircular zone under one portion of fastener 30 which is designated by $Z_c$, and the fourth zone is a semicircular zone under another portion of fastener 30 which is designated by $Z_d$. See FIG. 4. Reference numeral 70 and 71 designate a plurality of arrows indicating the forces exerted by zone $Z_b$ on track 50 and the forces exerted by zone $Z_d$ of fastener face 37 on track 50.

A centerline 10a extends through stud 10 with the direction of the arrows representing the direction of forces generated by coaction of stud 10 and fastener 30. The dynamic forces are primarily located in zone $Z_d$ and zone $Z_b$. The purpose of the diagram is to illustrate that, with a force F applied to the end of stud 10 having a length L, sufficient torque exists which tips the stud to deform track 50 around stud 10. However, as can be seen in FIG. 3, track 50 remains sandwiched firmly between head 15 and fastener 30 even though track 50 is deformed by the tipping forces on track 50. Furthermore, fastener 30 and head 15 are captured and held in a substantially parallel relationship to each other to prevent pinching of any portion of the track 50, which can weaken or cut the track. The tensile force on track 50 is indicated by $T_f$, and the coaction of the forces acting on the stud are such that the stud 10 may be tilted from the vertical line $V_L$, and angle designated by 0. However, the resiliency of track 50 is such that the track returns to its normal straight condition after the stud disengages the terrain. As stud 10 returns to its normal vertical position, track 50 internally flexes to absorb the dynamic forces on stud 10 without any engagement of sharp edges or slippage of the track. Consequently, the problem of track 50 being damaged by stud tipping has been virtually eliminated since the track moves as an integral mass with the stud and the fastener.

In general, fastener 30 for holding a snowmobile track stud 10 in place on a snowmobile track has a head 15 for resting against a surface of the snowmobile track and an elongated threaded shaft 13 extending from the center of head 15 through the track and terminating in a generally pointed end 11. The fastener 10 is made from a rigid inflexible member having an axial threaded opening 33 for engaging the threaded shaft 13 of the stud for drawing the fastener toward a surface of the snowmobile track that is opposite the head 15 of the stud. The fastener flares radially outward and has a bearing surface 37 for pressing against the track as the threaded opening 33 is securely threaded onto stud shaft 13 to capture the track between the stud-head 15 and fastener 10. The periphery of bearing surface 37 extends substantially beyond the periphery of stud-head 15.

Figure 6:
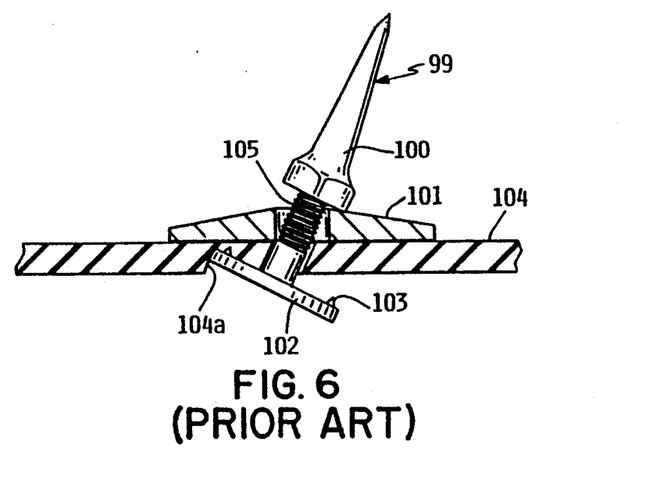
FIG. 6 shows the prior art stud and its relationship to a snowmobile track.

To illustrate the prior art problem of stud tipping in the snowmobile track as the terrain engages the stud, a prior art stud 99 and track 104 are shown in FIG. 6. The prior art stud 99 is shown as having a head 102 with a surface 103 for engaging the track. A separate washer 101 extends on one side of track 104 with a spiked nut 100 located on one end of stud 105. As can be seen in the drawing, head 102 of stud 105 can effectively tip with respect to washer 101 as stud 99 engages the terrain. That is, the surfaces on washer 101 and head 102 do not remain in a parallel relationship as stud 99 tips. Consequently, the force of the tipping stud is concentrated against region 104a on track 104 which eventually weakens and forms a hole in track 104. As track 104 becomes weaker due to repeated cycling of stud tipping forces, centrifugal force on stud 99 propels the stud through the enlarged hole in the track. This prior art problem of the track being damaged by the stud tipping and pinching the track has been virtually eliminated with the present invention.

Figure 5:
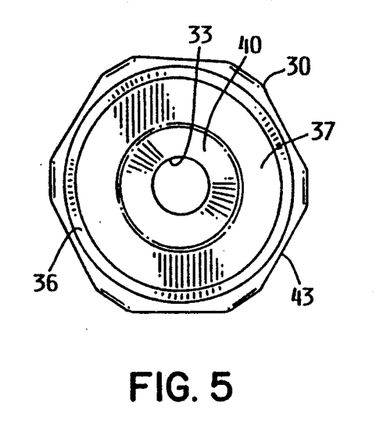
FIG. 5 is a bottom view of the fastener of FIG. 1.

FIG. 5 shows a bottom view of fastener 30 revealing the underside of flange 35 including annular track-engaging face 37 with track-gripping ring 36 located on the outer periphery of fastener 30. The interior portion of fastener 30 includes radiused annular shoulder 40 of radius $R_a$ which smoothly connects threads 33 in collar 32 with annular track-engaging face 37.

Figures 7, 8:
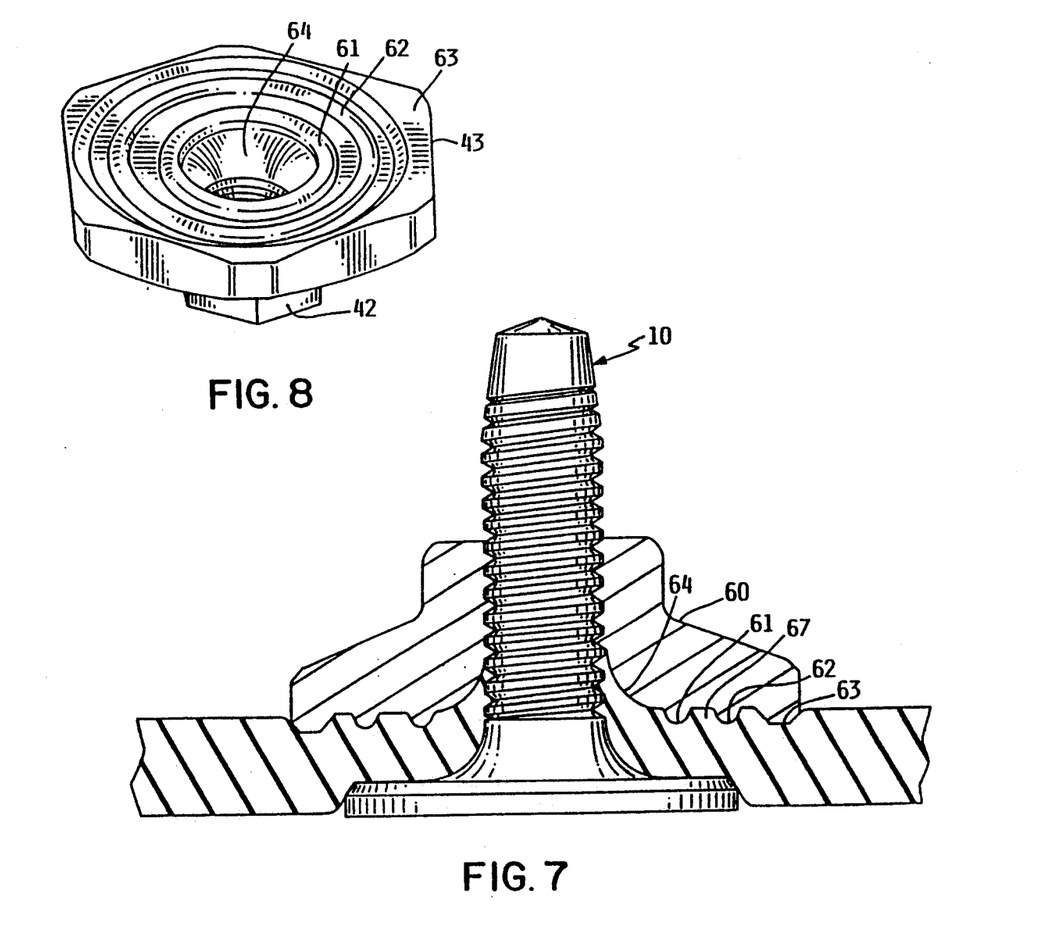
FIG. 7 is an alternate embodiment of a fastener engaging a snowmobile track.
FIG. 8 is a pictorial view of the underside of the fastener of FIG. 7.

FIG. 7 shows an alternate embodiment of a fastener 60 which is identical to fastener 30 except that multiple gripping rings 61, 62 and 63 are located on the annular track-engaging face 67 of fastener 60. The other portion of the stud and the track are identical.

FIG. 8 is a perspective view of an alternate embodiment of fastener 60 showing the plurality of concentric gripping rings 61, 62 and 63 located in coaxial relationship around radiused shoulder 64.

In operation, my one-piece lightweight snowmobile fastener 10 secures a snowmobile stud to a resilient snowmobile track through the clamping coaction of annular radiused shoulder 40 and annular radiused flange 14 and annular track-engaging surface 37 and annular surface 18. The annular reinforcing shoulder or support ring 39, which is integrally connected to collar 32 and to flange 35, provides reinforced support against stud 10 tipping and pinching track 10. The annular reinforcing shoulder is sufficiently strong to prevent limit flexing and prevent breaking of flange 35 when a lateral force is applied to the end of a snowmobile stud extending through collar 32. The strength of the annular reinforcing shoulder will vary with the type of snowmobile, horsepower and use of the vehicle. I have found that the combination of the annular reinforcing shoulder and the flange as an integral one-piece fastener prevent tipping of stud 10.

Typically, flange 35 extends radially outward from male threads 33 sufficiently far so that when a force is applied to the ice-biting region 12 of snowmobile stud 10, the resulting torquing force applied to the snowmobile track by the head and fastener is less than the tear strength of the snowmobile track. This prevents the snowmobile stud from working free of the snowmobile track.

FIG. 2 shows that fastener 30 includes two sets of flat hex surfaces 42 and 43 for engaging a wrench to permit a user to rotate fastener 30 onto stud 10. The purpose of two sets of flats is to provide an alternate means to remove the fastener in the event one set of flats becomes damaged by objects located on the snowmobile trail.

FIG. 1 shows flange 35 having a diameter $2R_N$ which is greater than the diameter $2R_S$ of head 15. FIG. 1 and FIG. 9 also show snowmobile stud 10 having a seven-millimeter male thread 13 for lockingly engaging a seven-millimeter female thread 33. In order to lockingly engage fastener 30 with stud 10 and ensure that fastener 30 does not unscrew by itself, I provide an interference fit between male thread 13 and female thread 33. Other means, such as use of cross-threads or the like, could be used to lock the male thread to the female thread. FIG. 11 shows a fastener 80 having radially extending openings with members 82, 83, and 84 located therein. Each of the members extends into the threaded area to form an interference between the threads on the stud and the threads on the fastener. For example, member 82 is frictionally held in opening 81, by an interference fit with the sidewalls of opening 81 with the end 82a extending outward into the threaded region. Member 82 may be a deformable material, such as plastic or the like, which, although deformable, maintains sufficient resiliency to cause binding between the fastener and the stud and thus prevent the fastener from working loose.

The length of female thread 33 in fastener 30 is identified by the length $L_T$. In order to have sufficient threads to withstand the torquing forces on the stud, the length of threads $L_T$ should be about one to two times the diameter of the threads $D_S$. Preferably for aluminium, the distance $L_T$ should be about two times the diameter $D_S$. FIG. 9 also shows the snowmobile stud-head having a thickness $t_1$ and the fastener flange having a thickness $t_2$. In order to withstand the forces on high powered snowmobile, the thickness of flange $t_2$ should be a minimum of about two times $t_1$ if the fastener and the stud are made of the same materials. With lower powered snowmobiles, the thickness could be correspondingly reduced if desired.

FIG. 1 shows snowmobile stud 10 having a flat head 15 extending substantially perpendicular outward from male thread 13. Flat head 15 is shown with the exterior surface 17 mounted substantially flush with surface 50b of track 50. The annular track-engaging face 37 and annular inner stud-face 18 are located in substantially coaxial and parallel relationship, so that flange 35 and head 15 coact to compress, grip and sandwich snowmobile track 50 therebetween. By firmly engaging the snowmobile track over an extended area, both surface 50g and 50b prevent stretching and pinching of the snowmobile track in the regions sandwiched between annular inner stud-face 18 and annular track-engaging face 37 of flange 35 to prevent flexing and breaking of flange 35 when a force is applied to the end of snowmobile stud 10 extending through collar 32. In addition, it prevents pinching of track 50.

The diameter of flange is identified by $2R_N$. In order to prevent stud-head 17 from pulling through the track in machines that typically may have up to 100 horsepower or more, the diameter of stud $2R_N$ should be larger than the diameter $2R_S$ of head 15. The use of unequal diameter stud-head and fastener prevents concentration of forces around one region of the track. I have found that a flange diameter $2R_N$ of at least about one inch and a head diameter $2R_S$ of about 13/16 of an inch provides support without tearing the track. For most track applications, $2R_N$ should be a minimum of about one inch in diameter, and $2R_N$ should be about 1/16 to 3/16 of an inch greater in diameter than the head dimension $2R_S$. With the above dimension relationship the flange extends radially outward from central axis 10a sufficiently far so that when a twisting force is applied to flange 35, the track-engaging face of flange 35 distributes the twisting forces over an extended area on both sides of the track to prevent tearing of the track due to cyclical pinching of the track.

Figure 12:
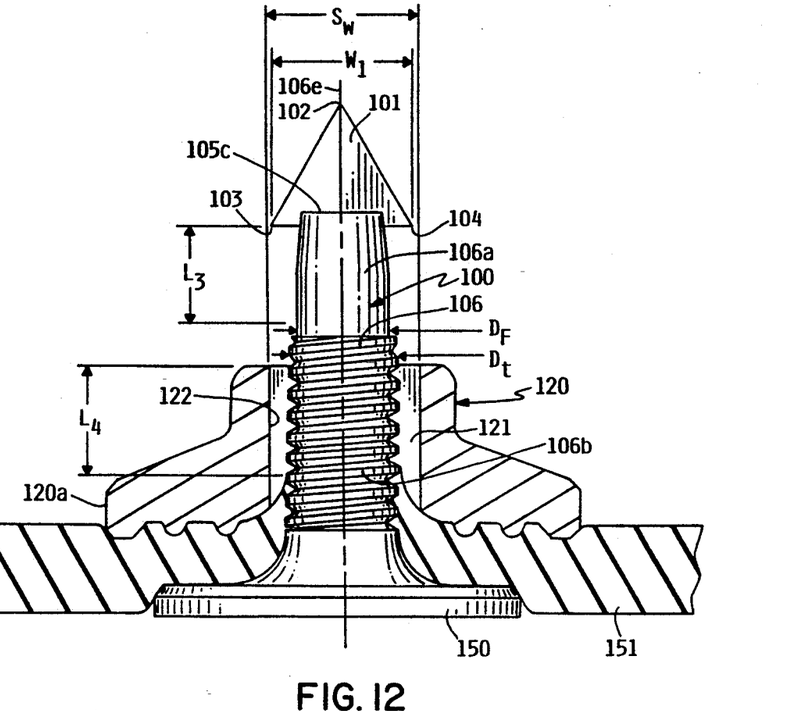
FIG. 12 is a partial cross sectional view of an alternate embodiment of a stud and fastener.
Figure 13:
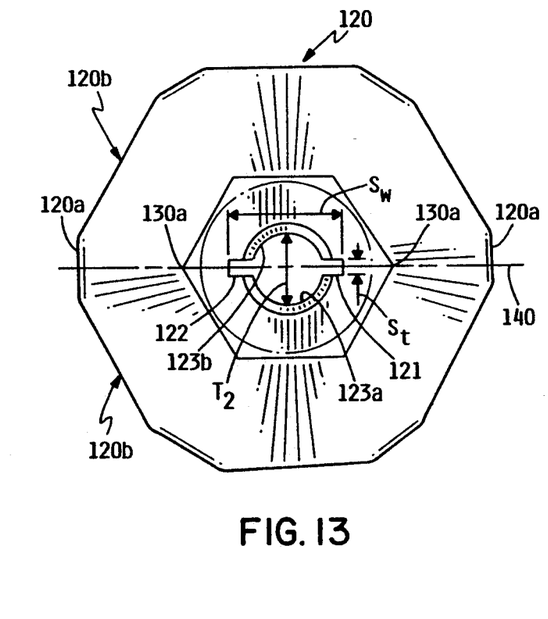
FIG. 13 is a top view of the fastener of FIG. 12.
Figure 14:
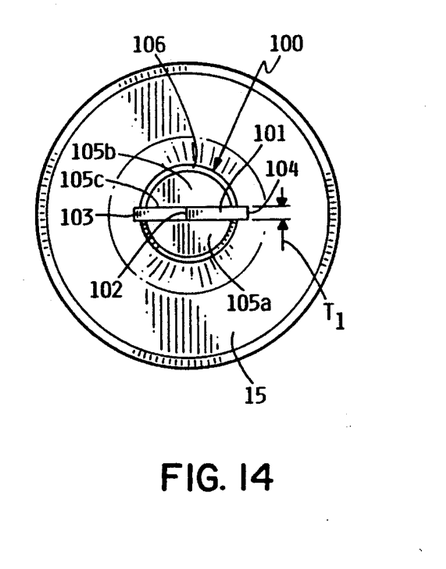
FIG. 14 is a top view of the stud of FIG. 12.

FIGS. 12, 13, and 14, show an alternate embodiment of a stud 100 and a fastener 120. Stud 100 is a power stud since greater traction can be generated with a laterally extending blade 101 than with a similar conical pointed stud. The snowmobile stud 100 comprises a shank 106 having a male thread 106b with maximum diameter $D_T$ extending along a portion of shank 106. Shank 106 has a central axis 106e with a first end having a blade insert 101, with the blade insert having a width $W_1$ greater than the male thread diameter $D_T$. The shank includes a non-fastener engaging region 106a proximate insert 101 to permit a user to place a slotted, threaded fastener 120 over insert 101 and displace the slotted, threaded fastener 120 axially along shank 106 without having to engaging male threads 106b on shank 106. A head 150 extends substantially perpendicular outward from the second end of shank 106 for engaging a first portion of a snowmobile track 151.

More specifically, stud 100 includes a triangular shaped hardened blade like insert 101 having a pointed tip 102 with a base 105 located in a slot 105c on end of shank 106 of stud 100. Insert 101 may be held in shank 106 by welding or the like. FIG. 14 shows a top view of stud 100 without fastener 120. A first semi-cylindrical portion 105a of shank 106 extends on one side of insert 101, and a second semi-cylindrical portion 105b of shank 106 extends on the other side of insert 101. Typically, insert 101 can be a material, such as carbide or the like.

FIG. 12 indicates that the width of triangular insert 101 as designated by $W_1$, and the width of a slot opening in fastener 120 is indicated by $S_w$. That is, in the embodiment shown in FIG. 12, the edges 103 and 104, although they project outward beyond the diameter of the threads of shank 106b, the overall dimensions $W_1$ and $T_1$ are less than the dimensions of slot openings 121 and 122, so that insert 101 can be inserted freely through an elongated slot formed by side slot 121, side slot 122 and threaded opening in fastener 120. One of the purposes of extending the width of carbide tips outward beyond the diameter $D_T$ of shank 106 is to increase the lateral surface area of the stud that can engage the ice and snow and thus increase the traction of the stud. In order to permit a wide insert 101 to pass through fastener 120, I provide a first slot 121 in one side of fastener 120 and a second slot in the other side of fastener with slots 121 and 122 being in alignment with a centerline 140 extending through the center of fastener and through the most massive region 120a and 130a of fastener 120.

FIG. 13 shows that slots 121 and 122, which are located on a diameter of the opening in fastener 120, produce a first half-threaded section 123a and a second half-threaded section 123b in fastener 120. The slot width is indicated by $S_w$ and is slightly larger than the maximum dimension $W_1$ of the triangular insert. Similarly, the thickness $T_1$ of insert 101 is less than the width $S_T$ of slots 121 and 122. Consequently, fastener 120 can be inserted axially downward along axis 106e and onto the threaded shank 106 of stud 100 by aligning the slots 121 and 122 with the triangular insert 101. Once the top of fastener 120 clears insert 101, the user can engage fastener threads 123a and 123b with stud threads 106b to secure track 151 between head 150 and fastener 120 as shown in FIG. 12.

Note, in the embodiment shown in FIG. 13, slots 121 and 122 are in alignment with an axis 140 that extends through the points of maximum mass 120a and 130a on fastener 120, thereby minimizing any weakening effect as a result of use of slots in fastener 120.

Stud 100 also includes a non-fastener engaging section 106a that permits insertion of fastener 120 over insert 101 without having to rotate fastener 120. Non-fastener engaging section 106a has a length $L_3$ which is free of threads. The maximum diameter $D_F$ of non-fastener engaging section 106a is smaller than the diameter $T_2$ of the opening between threads 123a and 123b in fastener 120. The length of the non-fastener engaging section, which is designated by $L_3$, being slightly larger than the length of threads $L_4$ in fastener 120 prevents engagement of female threads 123a and 123b in fastener 120 with male thread 106b until the top of fastener 120 clears the underside of insert 102. Consequently, fastener 120 can be inserted axially downward on stud 100 without the need to rotate fastener 120 until the threads of fastener 120 clear the underside of insert 101. After the fastener clears insert 101 the operator can then proceed to rotate fastener 120 onto threads 106b to engage track 151 between head 150 and fastener 120 as shown in FIG. 12. Thus, with the present invention, I am able to use a threaded fastener with a stud having a permanent integral head for engaging the snowmobile track and a power tip that projects beyond the diameter of the threads on the shank of the snowmobile stud.

I claim:

1. A one-piece, lightweight snowmobile fastener comprising:
   a collar having a first end and a second end, said collar having a central bore for receiving and lockingly engaging a male thread;
   a flange integrally attached to said second end of said collar, said flange having an annular track-engaging face for engaging a first track surface, said flange integrally attached to said collar by a radiused shoulder to permit tear-free engagement with the first track surface; and
   an annular reinforcing shoulder integrally connected to said collar and to said flange, said annular reinforcing shoulder sufficiently massive so as to prevent flexing or bending of said flange when a force is applied to the end of a member extending through said collar, to distribute the force applied to the end of the member over an extended region of the first track surface to prevent tearing of the first track surface by said flange.

2. The one-piece, lightweight snowmobile fastener of claim 1 wherein said flange includes a gripping ring and said flange is free of any surfaces that may cut the first track surface in engagement with said flange.

3. The one-piece, lightweight snowmobile fastener of claim 1 including a snowmobile track and a snowmobile stud having an ice-biting region, a male thread, and a head free of any surfaces that may cut a second track surface.

4. The one-piece, lightweight snowmobile fastener of claim 3 wherein said flange has a diameter of at least one inch with said flange extending radially outward from said male thread sufficiently far so that when a force is applied to the ice-biting region of said snowmobile stud the resulting torquing force is distributed over said snowmobile track to thereby prevent said snowmobile stud from working free of said snowmobile track.

5. The one-piece, lightweight snowmobile fastener of claim 3 wherein said snowmobile stud includes a hex recess for engaging a hex wrench to permit a user to prevent said snowmobile stud from rotating when said fastener is secured to said snowmobile stud and the diameter of said head is at least 1/16 of an inch less than the diameter of said flange.

6. The one-piece, lightweight snowmobile fastener of claim 5 wherein said fastener includes at least two spaced apart surfaces for engaging a wrench to permit a user with a wrench to rotate said fastener onto said snowmobile stud with either of said surfaces for engaging a wrench.

7. The invention of claim 6 wherein said radiused shoulder on said fastener comprises an annular radiused shoulder for engaging the annular portion of said snowmobile track located around a hole in said snowmobile track.

8. The one-piece, lightweight snowmobile fastener of claim 7 wherein said snowmobile stud includes an annular radiused shank for engaging a second portion of said snowmobile track to permit said annular radiused shoulder and said annular radiused shank to sandwich and grip said snowmobile track therebetween.

9. The one-piece, lightweight snowmobile fastener of claim 8 wherein the diameter of said flange is at least one inch and the diameter of said flange is at least 3/16 of an inch greater than the diameter of said head.

10. Lightweight means for securing a snowmobile stud to a resilient snowmobile track comprising:
    a snowmobile stud, said snowmobile stud having a male thread, said snowmobile stud having a head extending substantially perpendicular outward from said male threads, said head having an annular inner face for engaging a first portion of a snowmobile track, said head extending radially outward for engaging the first portion of one side of a snowmobile track and a radiused shank connecting said male thread to said head; and
    a one-piece snowmobile fastener for engaging said snowmobile stud, said fastener comprising a collar having a first end and a second end, said collar having a central bore having a female thread for engaging said male thread in said snowmobile stud, said fastener including a flange attached to said second end of said collar, said flange having an annular track-engaging face for engaging a second portion of the resilient snowmobile track, said fastener having an annular reinforcing radiused shoulder connected to said collar and to said flange so that when said fastener is secured to said snowmobile stud, said annular inner face on said head and said annular track-engaging face are located in substantially parallel relationship so that said flange and said head coact to compress and sandwich the snowmobile track therebetween in a non-pinching mode to thereby firmly engage said snowmobile track over an extended region to retard pinching and tearing of the snowmobile track in the region of the snowmobile track sandwiched between said annular head and said fastener when a lateral force is applied to the end of the snowmobile stud extending through said collar.

11. The lightweight means of claim 10 wherein said snowmobile stud includes a blade-type insert for engaging a surface.

12. The lightweight means of claim 10 wherein said head and said flange are free of any surfaces that may cut the snowmobile track in engagement with said flange.

13. The lightweight means of claim 10 wherein said head and said flange extend radially outward from said male thread sufficiently far, so that when a force is applied to an ice-biting region of said snowmobile stud, the torquing force applied to said snowmobile track is less than the tear strength of said snowmobile track.

14. The lightweight means of claim 10 wherein said snowmobile stud includes a hex recess for engaging a hex wrench to permit a user to prevent said snowmobile stud from rotating when said fastener is secured to said snowmobile stud.

15. The lightweight means of claim 10 wherein said fastener includes surfaces for engaging a wrench to permit a user to rotate said fastener onto said snowmobile stud.

16. The lightweight means of claim 10 wherein said fastener includes a slot to permit insertion of the fastener over a blade on said snowmobile stud.

17. The lightweight means of claim 10 wherein the flange has a diameter $2R_N$ and said head has a diameter $2R_S$ wherein said diameter of said flange is greater than the diameter of said head.

18. The lightweight means of claim 10 wherein said snowmobile stud has a conical point.

19. The lightweight means of claim 10 wherein said fastener comprises aluminum.

20. The lightweight means of claim 10 wherein said fastener comprises carbon fiber.

21. The lightweight means of claim 10 wherein said fastener comprises a polymer plastic.

22. A one-piece lightweight snowmobile fastener for securing a snowmobile stud to a resilient snowmobile track comprising:
a collar having a first end and a second end, said collar having a central bore having a surface for engaging a shaft of a snowmobile stud, said collar including a central axis extending therethrough;
a radiused shoulder and a reinforcing shoulder integrally formed to said collar, with said reinforcing shoulder sufficiently massive so as to prevent flexing or bending thereof, said reinforcing shoulder extending radially outward of said collar; and
a flange integrally attached to said second end of said collar and to said reinforcing shoulder, said flange having a snowmobile track-engaging face and a gripping means for engaging one surface of a resilient snowmobile track, said flange extending radially outward from said central axis sufficiently far so that when a twisting force is applied to said flange the track-engaging face of said flange distributes the twisting forces over an extended area to prevent pinching of the snowmobile track.

23. The fastener of claim 22 wherein said surface for engaging a shaft of a snowmobile stud includes female threads.

24. An integral, one-piece lightweight snowmobile fastener for compressively securing a resilient snowmobile track between the lightweight snowmobile fastener and the head of a snowmobile stud comprising:
a cylindrical collar having a first end and a second end, said collar having a central bore having a surface for lockingly engaging a threaded shaft of a snowmobile stud, said collar including a central axis extending therethrough;
a radiused shoulder and a reinforcing shoulder integrally formed to said collar, said reinforcing shoulder extending in a direction generally perpendicular to said central axis and sufficiently massive so as to prevent flexing or bending thereof; and
a flange integrally attached to said second end of said collar and to said reinforcing shoulder, said flange having a snowmobile track-engaging face forming a washer for engaging one surface of a resilient snowmobile track, said flange extending radially outward from said central axis sufficiently far, so that when a twisting force is applied to said flange, the track-engaging face of said flange distributes a portion of the twisting forces over an area on both sides of the snowmobile track.

25. A fastener for holding a snowmobile track stud in place on a snowmobile track, said stud having a head for resting against a surface of the snowmobile track and an elongated threaded shaft extending from the center of the head through the track and terminating in a generally pointed end, said fastener comprising:
a rigid inflexible member having an axially threaded opening for engaging the threaded shaft of said stud for drawing said member toward a surface of the snowmobile track opposite the head of said stud, said member having a radiused shoulder flared radially outward, said member sufficiently massive so as to prevent flexing or bending thereof, with said member having a bearing surface for pressing against said track as the threaded opening is securely threaded onto said stud shaft to capture the track between said stud-head and said member, the periphery of said bearing surface extending substantially beyond the periphery of said stud-head.

26. A fastener for a snowmobile track stud as described in claim 25 wherein said bearing surface is orthogonal to said threaded opening and extends uniformly radially outward to a ring at its outer edge for embedding into said track when the member is securely threaded onto said stud shaft.

27. A fastener for a snowmobile track stud as described in claim 26 wherein said bearing surface is substantially smooth out to said ring.

28. A fastener for a snowmobile track stud as described in claim 26 wherein said bearing surface contains additionally radially-spaced rings for embedding into said track when said member is securely threaded onto said stud shaft.

29. For a snowmobile track, in combination:
a) a snowmobile track stud having a head for contacting a surface of a snowmobile track and an elongated threaded shaft fixedly attached to the center of the head, said shaft extending through the snowmobile track and having a generally pointed end for engaging the surface that the snowmobile travels over, the stud having a smooth surface radiused shank attaching the stud shaft to the stud-head;
b) a rigid single-piece fastener, said fastener having a generally centered threaded opening for threadably engaging the stud shaft to draw said fastener into contact with a surface of the snowmobile track opposite the stud-head, said fastener extending radially outward and having a bearing surface for contacting the snowmobile track to capture the track between the stud-head and said bearing surface when said fastener is securely threaded onto the stud shaft, the periphery of said bearing surface extending substantially beyond the periphery of said stud-head said fastener including a smooth surface radiused shoulder between the fastener threaded opening and said bearing surface with said shank radius and said shoulder radius being generally equal to one another to securely grasp and hold the snowmobile track between said smooth shank surface and said smooth shoulder surface when said fastener is securely threaded onto said stud shaft.

30. The combination for a snowmobile track is described in claim 29 wherein said bearing surface has a ring around its outer edge for embedding into said track when said fastener is securely threaded onto said stud shaft.

31. The combination for a snowmobile track as described in claim 29 wherein said bearing surface is substantially smooth out to said ring.

32. The combination for a snowmobile track as described in claim 29 wherein said bearing surface contains additional radially spaced rings for embedding into said track when said fastener is securely threaded onto said stud shaft.

33. A snowmobile stud comprising:
a shank, said shank having a male thread with maximum diameter $D_T$ extending along a portion of said shank, said shank having a central axis, a first and second a end, said shank having an insert located in said first end of said shank with said insert having a width greater than said diameter $D_T$, said shank having a non-fastener engaging region proximate said insert to permit a user to place a threaded fastener over said insert and displace the threaded fastener axially along said shank without having to engage the male threads on said shank; and
a head extending substantially perpendicular outward from said second end of said shank for engaging a first portion of a snowmobile track.

34. The snowmobile stud of claim 33 wherein said non-fastener engaging region is free of any threads.

35. The snowmobile stud of claim 34 wherein said male thread has a root diameter with the non-fastener engaging region having a maximum diameter that is less than the root diameter of said male thread.

36. The snowmobile stud of claim 34 including a slotted threaded fastener for extending over said insert to engage said male thread on said shank.

* * * * *